July 29, 1969 W. C. BURNS ET AL 3,458,618

METHOD OF FORMING AN INTEGRAL PLASTIC RIVET

Filed June 17, 1966

INVENTORS:
WILLIAM C. BURNS
RONALD B. TAYLOR

BY: *James H. Parker*.
THEIR ATTORNEY

United States Patent Office 3,458,618
Patented July 29, 1969

3,458,618
METHOD OF FORMING AN INTEGRAL PLASTIC RIVET
William C. Burns, Woodbury Heights, N.J., and Ronald B. Taylor, Swarthmore, Pa., assignors to Shell Oil Company, New York, N.Y., a corporation of Delaware
Filed June 17, 1966, Ser. No. 558,492
Int. Cl. B29d 9/06; B32b 3/06
U.S. Cl. 264—249   2 Claims

ABSTRACT OF THE DISCLOSURE

A method is provided for fastening a plastic sheet to one more other members by integral plastic rivets. In forming a rivet, the members are placed one on top of the other on a base plate which has on its surface one or more rivet head forming cavities. The upper member is a thermoplastic composition. The lower member may be plastic or other rigid material, i.e., metal, wood, ceramic, or cardboard. The lower member has one or more preformed annular openings and is placed on the surface of the base plate so that the annular openings are centered directly over the cavities of the base plate. Pressure is exerted on the upper member by a plunger above the circular opening through which a rivet is to be formed penetrating the upper member and the opening such that a portion of the thermoplastic composition of the upper member directly above the annular opening in the lower member is forced through the annular opening and into the base plate cavity. The base plate cavity has a circular channel at the bottom thereof and a projection in the center of the circular channel with the uppermost portion of the projection being lower than the surface of the base plate, whereby the thermoplastic material forced into said opening is deflected to form the plastic rivet.

---

This invention relates to a method for fastening together adjacent plastic members. More particularly, the invention relates to a method for fastening together plastic members by forming an integral plastic rivet.

Plastics have become increasingly important in the manufacture and preparation of a great variety of materials and articles. Many plastics are of relatively light weight and easy to produce and work into articles of practically unlimited forms and shapes, and yet are of high flexural and tensile strength. Such plastics may also be highly impact resistant as well as resistant to chemicals, solvents, weather, moisture, etc. thereby making it preferable to metals for many uses. Plastics may also be easily and permanently colored by introducing the pigment or coloring agent directly into the plastic forming material itself during preparation.

Although many articles may be formed by direct molding procedures some applications require fastening different members or forms of plastic together or fastening a plastic member to a non-plastic material. A member of different methods for fastening have been utilized such as metal rivets, pins, staples, brads, etc. as well as adhesive means and the like. These fastening methods have not been altogether satisfactory in many instances for various reasons. For example, where plastic air ducts are fabricated for uses such as for directing the air of automobile air conditioners, heaters or defrosters it has been found that metal fasteners often do not initially provide or maintain the close fit required between the plastic duct portions due to deformities caused by applying the fastener or by wear at the point of fastening or due to small imperfections in the fit of the plastic portions themselves. Thus, small gaps which occur in the duct work cause air circulation to be less efficient as well as cause undesirable and often annoying noises due to the escape of forced air from the duct. Metal fasteners also have the disadvantage that they do not often return to the original shape when even slightly bent or otherwise deformed. In addition, since metal is harder than plastic the latter becomes easily worn at the point of metal contact where there is movement at the point of contact. Lastly, in high humidity or corrosive environment metals corrode and break to render fastened parts useless.

It is an object of this invention to provide an improved method of fastening together two or more members at least one of which is a thermoplastic. It is also an object to provide a method for fastening together two members whereby they are prevented from separation. It is also an object to provide a method of rapidly and integrally fastening together two adjacent members. It is another object of the invention to provide a method for fastening together two adjacent members by means of an integral plastic rivet whereby the members may be rotatably moved relative to one another. These and other objects will become apparent from the following detailed description of the invention.

In general, the invention comprises fastening together two members by an integral plastic rivet. The rivet is formed by placing two members, one lying on top of the other, on a base plate which has on its surface one or more annular cavities. The lower member has one or more preformed annular openings through it and is placed on the surface of the base plate so that the annular openings are centered directly over the cavities of the base plate. The lower member may be plastic or may be made of some other rigid material such as thermoplastic or thermoset resins, metal, cardboard, ceramic, fiberboard, wood, and the like. The actual composition of the lower member is not critical as long as it is rigid enough to support the formation of the rivet. The upper member must be a thermoplastic resin material in order to form the rivet according to the invention. Pressure is exerted upon the upper member in such a manner that the portion of the upper plastic member directly above the annular opening in the lower member is forced through the annular opening and into the base plate cavity. A particularly advantageous manner in which pressure is exerted in the upper plastic member is by using a plunger which is located above the annular opening of the lower member and which is actuated and forced downward against the upper member so that a portion of the latter is forced through the annular opening of the lower member and into the base plate cavity thereby forming the rivet lock.

FIGURE 1 is a sectional view showing step 1 of the formation of the rivet whereby the adjacent members are properly positioned prior to plunger actuation.

FIGURE 2 is a sectional view, similar to FIGURE 1 showing step 2 of the rivet formation.

FIGURE 3 is a further sectional view similar to FIGURES 1 and 2 showing the final step of the rivet formation.

Figure 1:
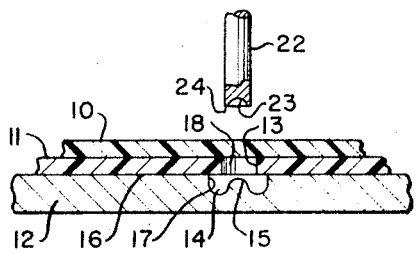
FIGURES 1–3 illustrate stepwise the procedure whereby two adjacent members are fastened together according to the invention.

Referring more particularly to the drawings, FIGURE 1 shows the two adjacent members or sheets 10 and 11 lying on a base plate 12 prior to formation of the integral rivet. The lower member 11 has one or more preformed annular openings 18 which are positioned respectively directly over one or more annular cavities in the base plate. The individual cavities of the base plate are shaped to form a circular channel 14 around a projection 15 located in the center of the base plate cavity with the inner sides of the circular channel also being the side of the projection. The shape of the channel may be varied as desired. The preferred channel shape will be U-shaped thereby producing a rounded rivet lock. However, the channel may conform to a △, V or other shape if desired. The outer side of the circular channel terminates at the edge 17 where it meets the upper surface 16 of the base plate. The projection 15 may be rounded at the top, pointed or may be flat but in every case with the upper most portion being lower than the upper surface of the base plate 16 so as to allow full formation of the rivet.

Figure 4:
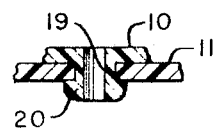
FIGURE 4 is a sectional view showing the formed plastic rivet.
Figure 6:
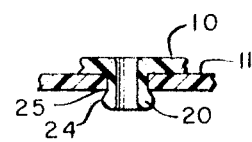
FIGURE 6 is a sectional view of an integral rivet having a different shape according to another embodiment of the invention.

According to a preferred embodiment a round plunger 22 is centered with respect to each annular cavity in the base plate so that when actuated the plunger will be thrust downward toward the cavity. The size of the plunger must be such that its diameter will be somewhat smaller than the diameter of the annular opening 18 of the lower member. The lower edge of the plunger 23 is preferably shaped so that it will fitably receive a portion of the upper edge of the projection 15 when the plunger is positioned in its lowest position thereby forming a rivet having a perforation through its center. For some uses, it is desirable that the rivet have a perforation through its center which has practically straight sides as shown in FIGURES 4 and 6. This may be accomplished by having a rather sharp edge at the junction 24 of the bottom and the side of the plunger.

The diameter of the preformed annular opening 18 of the lower plastic member must be somewhat larger than the diameter of the round plunger 22 and somewhat smaller than the diameter of the uppermost edge 17 of the annular base plate cavity so that its side 13 will project further toward the center of the base plate cavity than the edge of the annular base plate cavity 17. The lower member is positioned so that each of its annular openings is centered directly below a plunger and centered directly above the projection 15.

Figure 2:
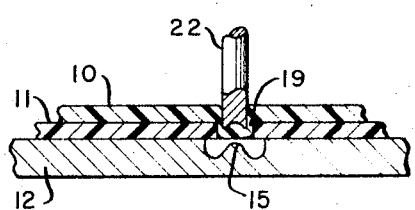

FIGURE 2 shows the beginning of the formation of the integral rivet with the downwardly moving plunger depressing the portion of the upper plastic member contacted by the plunger and forcing the plastic downward toward the base plate cavity.

Figure 3:
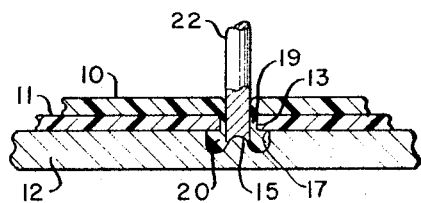

In FIGURE 3, the plunger has reached the lowest position and has contacted the projection 15. A portion of the plastic of the upper member is forced into and fills the cavity thereby forming the lock 20 of the plastic rivet conforming to the shape of the U-shaped circular channel of the cavity. Since the diameter of the cavity at the upper edge 17 is larger than the diameter of the annular opening 13 of the lower member, the rivet lock 20 is formed by the plastic being forced into and filling the base plate cavity. It is seen that the lateral expansion of the plastic forced into the base plate cavity provides the rivet lock whereby the upper plastic member is fastened to the lower member. The diameter of the plunger 22 being somewhat smaller than the diameter of the annular opening 13, a portion of the plastic forced by the plunger forms a uniaxially oriented connecting sleeve 19 between the rivet lock 20 and the upper plastic member 10.

Figure 5:
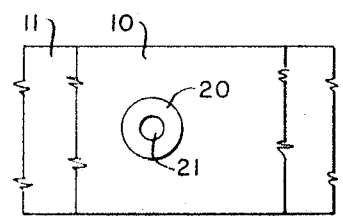
FIGURE 5 is a plan view showing the two members and the integral plastic rivet.

FIGURES 4 and 5 show different views of the two members 10 and 11 fastened together by the integral plastic rivet formed as described above. It will be appreciated that the diameter of the plunger will determine the size of the opening 21 in the center of the rivet and may be varied. In addition the strength and life of the integral rivet itself will depend to a great extent on the thickness of the connecting sleeve 19, which thickness depends on the difference between the diameters of the plunger and the annular opening in the upper member. Thus, the thickness of the connecting sleeve may be varied as desired. It is also seen from FIGURE 4 that the extent to which the forced plastic spreads laterally determines the extent that the rivet lock 20 engages the lower surfaces of the lower member 11 and the strength of the rivet. Thus, the size of the lock and the extent to which it engages the lower surfaces may be varied by changing the size and shape of the base plate channel 14 as described above. The advantage of having a rivet with a perforation through it, is that other members such as rods, axles, pins, etc. may be fitted therein or placed therethrough as desired.

In another embodiment, where it is desired to have a rivet which may be disengaged, the channel may be shaped so that the upper portion of the rivet lock does not engage along the lower surface of the lower member as shown in FIGURE 4 but instead is shaped as shown in FIGURE 6. In this manner the outer edge of the rivet lock 24 (the side farther away from the central axis of the rivet) gradually slopes downwardly and outwardly in relation to the rivet central axis from the point of contact of the rivet lock and the lower edge of the lower member at 25. Thus, the rivet such as shown in FIGURE 6 may be disengaged and re-engaged without permanent deforming of the rivet. One of the most significant advantages of an integral plastic rivet as described herein is that rather than the connection becoming lose fitting due to deformation or wear with ageing, it becomes more secure. The plastic "memory" acts to attempt retraction of the deformed rivet head back through the opening in the lower member. However, since it is unable to do this, the net effect is to draw the members closer together thereby forming a more secure connection during ageing.

Where the members are fastened together by only one rivet, they may be circularly moved with relation to each other around the rivet central axis without significant weakening of the rivet. This feature may be especially useful in the manufacture of toys and the like where such movement around a rivet is desired without substantial or permanent injury to the rivet or connected members resulting in a loose rivet connection or gradual weakening thereof. Although the invention has been described in terms of fastening together two members it should be appreciated that more than two members may be fastened in the manner described herein. Thus, for example, in the drawings, the lower member 11 may be two or more plastic or non-plastic members.

The mechanism used to actuate the plungers may be any suitable device which will drive the plungers downwardly to contact the base cavity projection and thereby form the rivet. The plungers may be driven by individual driving members acting simultaneously or alternately. However, it may be preferred to have the integral rivets formed simultaneously by a single stroke of a central driving member acting on multiple plungers.

The particular plastic material of which the upper member is composed and which forms the integral rivet may be any thermoplastic material such as cellulose acetate, ethyl cellulose, cellulose propionate, cellulose nitrate, polyamides (nylon), polyvinyl chloride, polyvinylidene chloride, chlorinated polyethers, polystyrene, styrene-conjugated diene copolymers, fluorocarbons such as polytrichlorotrifluoroethylene and polytetrafluoroethylene and polyolefins such as polyethylene and polypropylene and the like. Stabilizers and inhibitors as well as coloring agents, etc. may be present in the thermoplastic compositions.

We claim as our invention:

1. A method for fastening together upper and lower adjacent members, the upper member being composed of a thermoplastic resin material composition and the lower member being composed of a rigid material and having one or more annular openings therethrough which comprises placing the adjacent members on a base plate having one or more annular cavities on the surface thereof, the greatest diameters of each cavity being larger than the diameter of the annular openings of the lower member, so that the annular openings of the lower member are centrally located directly over the annular cavities of the base plate, the cavities having a circular channel at the bottom thereof and a projection in the center of the circular channel with the uppermost portion of the projection being lower than the surface of the base plate, and applying pressure to the portion of the upper member above the annular opening in the lower member and forcing a portion of the plastic of the upper member through the annular opening of the lower member into the base plate cavity by means of a plunger, having a cross-section smaller than the cross-section of the annular opening of the lower member, passing through said annular opening with a predetermined clearance to force the plastic downwardly and laterally until the forced plastic substantially fills and takes the shape defined by said base plate cavity, the bottom surface of said lower member and said plunger in its final position.

2. A method according to claim 1 wherein said thermoplastic resin material is selected from the group consisting of cellulose acetate, ethyl cellulose, cellulose propionate, cellulose nitrate, polyamides, polyvinyl chloride, chlorinated polyethers, polystyrene, fluorocarbons and polyolefins.

References Cited

UNITED STATES PATENTS

| | | | |
|---|---|---|---|
| 1,784,780 | 11/1927 | Bronson | 264—249 X |
| 2,644,199 | 7/1953 | Miller | 264—323 X |

ROBERT F. WHITE, Primary Examiner

T. J. CARVIS, Assistant Examiner

U.S. Cl. X.R.

264—323